United States Patent
Brause et al.

(10) Patent No.: US 9,293,162 B1
(45) Date of Patent: Mar. 22, 2016

(54) ACTUATOR COMB HAVING A STEPPED INNER BORE

(71) Applicant: HGST Netherlands B.V., Amsterdam (NL)

(72) Inventors: David D. Brause, Longmont, CO (US); Janice E. Heil, Boulder, CO (US); Matthew J. Sandor, Denver, CO (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/481,584

(22) Filed: Sep. 9, 2014

(51) Int. Cl.
G11B 5/55 (2006.01)
G11B 21/08 (2006.01)
G11B 5/48 (2006.01)

(52) U.S. Cl.
CPC ............ G11B 5/4813 (2013.01); G11B 5/4826 (2013.01)

(58) Field of Classification Search
CPC ... G11B 5/4826; G11B 5/4813; G11B 5/4833
USPC ............................................. 360/265.2–266.1
See application file for complete search history.

(56) References Cited

U.S. PATENT DOCUMENTS

| | | | | |
|---|---|---|---|---|
| 5,315,465 | A * | 5/1994 | Blanks | 360/265.6 |
| 6,018,441 | A * | 1/2000 | Wu et al. | 360/265.6 |
| 6,212,927 | B1 | 4/2001 | Misso et al. | |
| 6,288,879 | B1 | 9/2001 | Misso et al. | |
| 6,480,363 | B1 | 11/2002 | Prater | |
| 8,228,640 | B2 * | 7/2012 | Woodhead et al. | 360/265.6 |
| 8,424,184 | B2 | 4/2013 | Hughes | |
| 8,485,752 | B2 | 7/2013 | Slayne | |
| 2004/0246627 | A1 * | 12/2004 | Durrum et al. | A61K 31/405 360/265.6 |
| 2005/0264942 | A1 * | 12/2005 | Tsuda et al. | 360/265.7 |
| 2006/0181811 | A1 | 8/2006 | Hanrahan et al. | |
| 2009/0285627 | A1 * | 11/2009 | Slayne | 403/368 |
| 2013/0315654 | A1 | 11/2013 | Nias et al. | |

OTHER PUBLICATIONS

Somkid Suthaweesub et al., Design of the Tolerance Ring in the Actuator Arm of a Hard Disk Drive Using Finite Element Analysis, Computer-Aided Design & Applications, 2011, pp. 1-14, vol. 8(a), http://www.cadanda.com.
Khosak Achawakorn et al., The Effect of Pivot Bearing Assembly Process on Natural Frequency of Actuator Arm, The Second TSME International Conference on Mechanical Engineering, Oct. 19-21, 2011, AMM19, TSME, Krabi, Thailand.

* cited by examiner

*Primary Examiner* — Adam B Dravininkas
(74) *Attorney, Agent, or Firm* — John D. Henkhaus

(57) ABSTRACT

A head stack assembly (HSA) having an actuator comb with a stepped inner bore may have an upper portion of the inner bore with a first diameter that is greater than the diameter of a lower portion of the inner bore. Therefore, little friction and resistance is encountered when force fitting a pivot-bearing assembly into the upper portion of the stepped inner bore, thereby avoiding surface damage and the generation of unwanted debris particles. The HSA may further comprise a plurality of tolerance rings to couple the actuator comb with the pivot-bearing assembly, such as one tolerance ring positioned below the step feature and one tolerance ring positioned above and seated on the step feature of the comb inner bore.

18 Claims, 4 Drawing Sheets

A - A

INSERT A TOLERANCE RING INTO AN ACTUATOR COMB INNER BORE HAVING A STEP FEATURE
502

INTERFERENCE FIT A PIVOT ASSEMBLY INSIDE OF THE TOLERANCE RING AND THE ACTUATOR COMB, WHEREIN FRICTION BETWEEN THE PIVOT ASSEMBLY AND THE INNER BORE OF THE ACTUATOR COMB IS MINIMAL UNTIL THE PIVOT ASSEMBLY REACHES A LOWER PORTION OF THE INNER BORE BELOW THE STEP FEATURE
504

ACTUATOR COMB HAVING A STEPPED INNER BORE

FIELD OF EMBODIMENTS

Embodiments of the invention may relate generally to hard disk drives and more particularly to an actuator comb with a stepped bore for seating a tolerance ring.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Actuator assemblies used to move the read/write head typically include, among other components, an actuator comb having one or more actuator arms and a pivot-bearing (or "cartridge bearing" or "bearing cartridge") positioned around a pivot-shaft all within the central bore of the actuator comb. A continuing challenge lies with attaching the actuator comb to the pivot-bearing.

One approach may be to use an adhesive such as glue to adhere the comb to the bearing cartridge, however, when curing in an oven the mismatch between materials may cause torque shifts in the assembly. Further, use of adhesives makes it much more difficult to repair and rework the actuator assembly, as well as uses valuable assembly time and oven space.

Another approach may be to use a tolerance ring inside the bore of the actuator comb, thereby providing an interference fit between the comb and the bearing cartridge. However, the acts of fitting the tolerance ring within the comb bore and fitting the bearing cartridge within the tolerance ring-comb assembly may generate undesirable debris particles when forcibly pressing into the comb.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a head stack assembly (HSA) having an actuator comb with a stepped inner bore, a hard disk drive (HDD) including such an assembly, and a method of manufacturing an associated assembly. The step feature of the stepped inner bore may be such that an upper portion of the inner bore above the step feature has a first diameter that is greater than the diameter of a lower portion of the inner bore below the step feature. Therefore, little resistance and friction is encountered when force fitting a pivot-bearing assembly into the stepped inner bore, until the pivot-bearing reaches the lower portion of the stepped inner bore below the step feature, thereby limiting surface damage and the generation of unwanted debris particles by scraping one metal against another.

According to an embodiment, the HSA may further comprise a tolerance ring disposed within and seated on the step feature of the inner bore, to couple the actuator comb with the pivot-bearing assembly. According to an embodiment and in a context in which the actuator comb includes a plurality of actuator arms, the HSA may include a plurality of tolerance rings, such as one positioned below the step feature and one positioned above and seated on the step feature of the comb inner bore.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a head stack assembly (HSA) having an actuator comb with a stepped inner bore are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used in the context of an actuator assembly in a hard-disk drive (HDD) data storage device. Thus, in accordance with an embodiment, a plan view illustrating an HDD 100 is shown in FIG. 1 to illustrate an exemplary operating environment.

Figure 1:
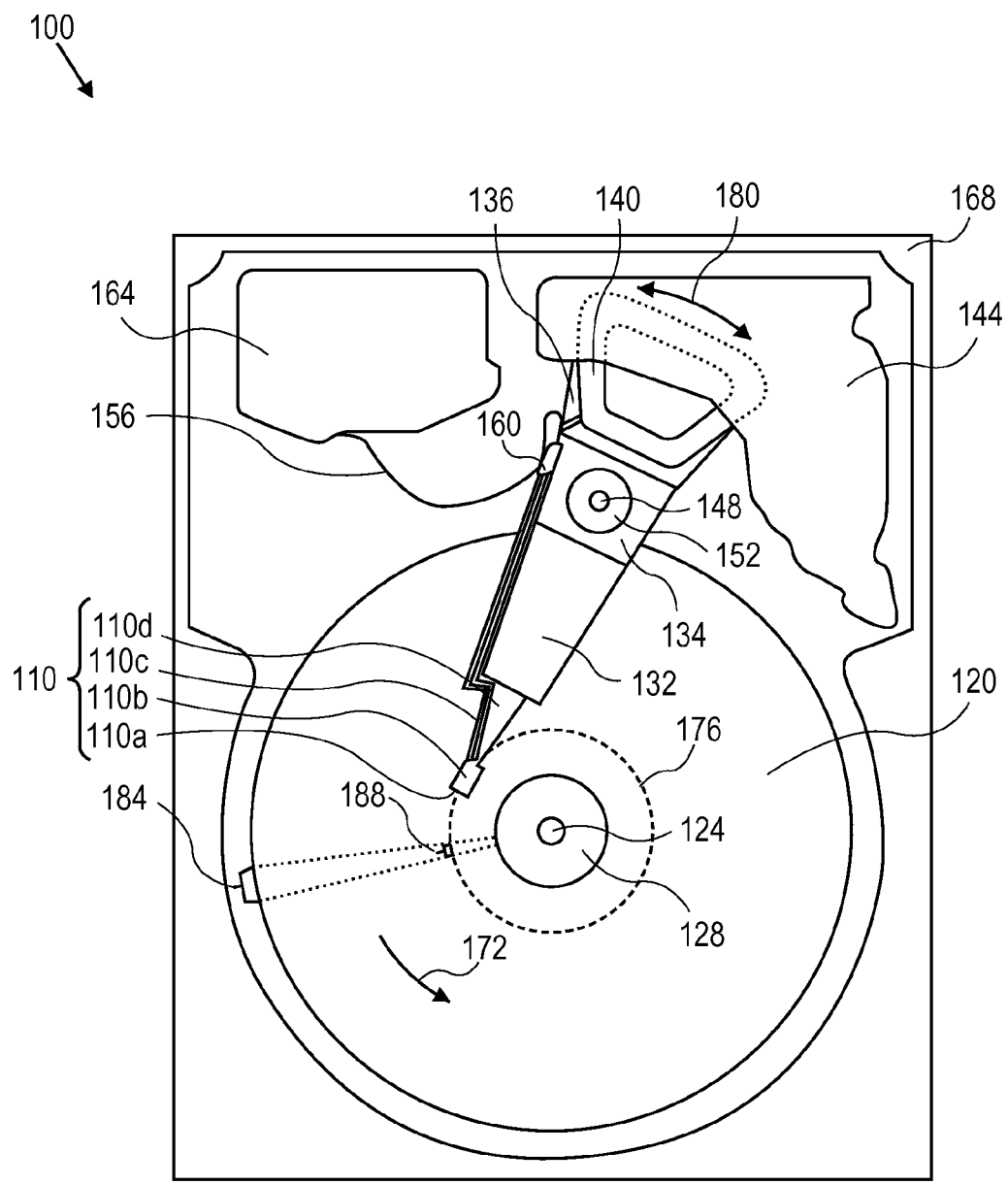
FIG. 1 is a plan view illustrating a hard disk drive, according to an embodiment.

FIG. 1 illustrates the functional arrangement of components of the HDD 100 including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one magnetic-recording medium 120 rotatably mounted on a spindle 124 and a drive motor (not visible) attached to the spindle 124 for rotating the medium 120. The head 110*a* includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are provided by a flexible interconnect cable 156 ("flex cable"). Interconnection between the flex cable 156 and the head 110*a* may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

As discussed, one approach to coupling an actuator comb to a pivot-shaft via a pivot-bearing may involve the use of a tolerance ring inside the bore of the actuator comb, thereby providing an interference fit between the comb and the bearing cartridge. However, the acts of fitting the tolerance ring within the comb bore and fitting the bearing cartridge within the tolerance ring-comb assembly may generate undesirable debris particles when forcibly pressing into the comb.

Furthermore, in the context of HDDs having a relatively large number of disks and thus a relatively large number of actuator arms coupled with the actuator comb, this challenge associated with attaching the actuator comb to the pivot assembly may be exacerbated because of the correspondingly large (height, or Z-direction) actuator assembly. Use of a single tolerance ring in this context of a tall actuator comb is not necessarily a preferred solution because of the high cost associated with a tolerance ring of such stature, essentially because such a tolerance ring is not a commonly fabricated part and therefore does not enjoy the economies of scale and mass production, and could require special tooling.

Actuator Comb with a Stepped Inner Bore

Figure 2:
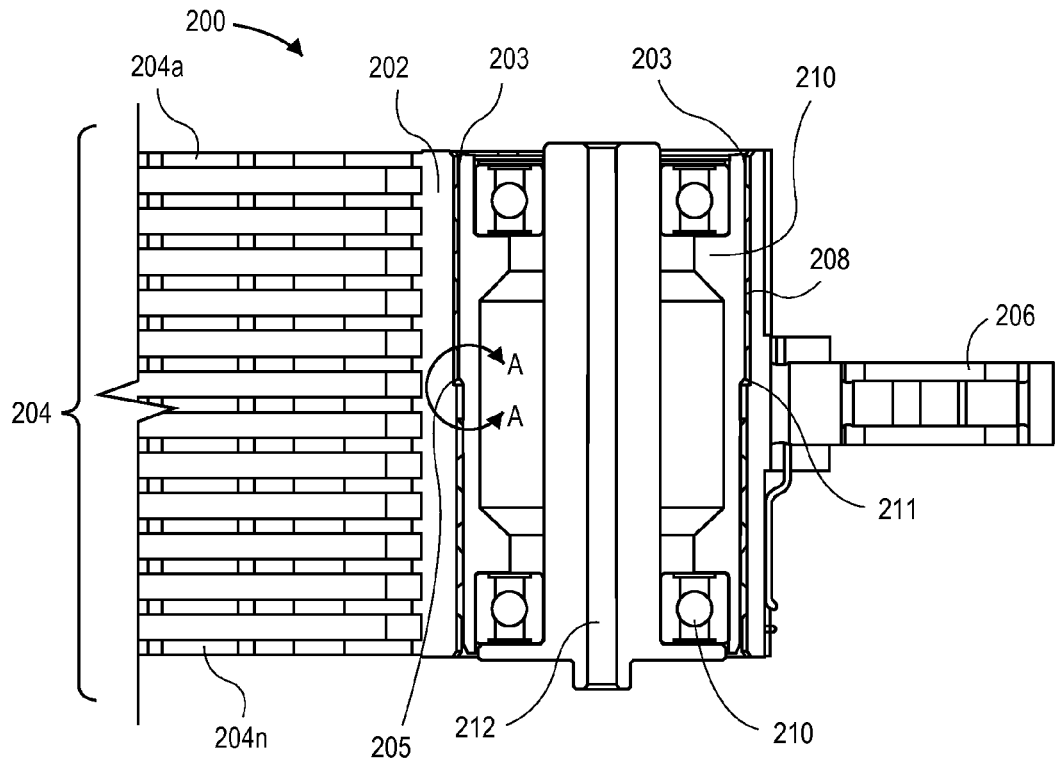
FIG. 2 is a partial cross-sectional side view illustrating a head stack assembly (HSA), according to an embodiment.

FIG. 2 is a partial cross-sectional side view illustrating a head stack assembly (HSA), according to an embodiment. HSA 200 includes an actuator comb 202 having one or more actuator arm 204a-204n, collectively referred to as actuator arm(s) 204, and a coil 206 which is part of a voice coil motor when paired with a set of magnets within an HDD such as HDD 100 (FIG. 1). Actuator comb 202 has an inner bore 203 which, according to an embodiment, has a step feature 205. Within the stepped inner bore 203 is seated at least one tolerance ring 208, according to an embodiment, which facilitates an interference fit for a pivot-bearing 210 (also referred to as a "bearing cartridge"). According to an embodiment, the outer surface of the pivot-bearing 210 has a step feature 211 which generally corresponds to, but need not be identical to, the step feature 205 of inner bore 203. The pivot-bearing 210 is interposed between a pivot-shaft 212, which is typically affixed to an HDD base (see, e.g., housing 168 of FIG. 1), and the actuator comb 202. As such, pivot-bearing 210 is inset within inner bore 203 and thereby coupled with actuator comb 202 by way of the at least one tolerance ring 208.

An actuator comb 202 having a stepped inner bore 203 having a step feature 205 therefore comprises an upper portion of the inner bore 203 which has a first diameter and a lower portion of inner bore 203 which has a second diameter that is less than the first diameter, according to an embodiment. Stated otherwise, the diameter of the inner bore 203 is larger at the upper portion than the diameter at the lower portion. Thus, with a stepped inner bore such as inner bore 203 of actuator comb 202, when assembling the actuator comb 202 with the pivot assembly (e.g., pivot-shaft 212 and pivot-bearing 210) from the top of the actuator comb 202 down into the comb 202, the tolerance ring 208 may be placed inside of the actuator comb 202 and then the pivot-bearing 210 forcibly fit inside of the tolerance ring 208. Notably, because of the step feature 205 of stepped inner bore 203 there is very limited friction or resistance between the pivot-bearing 210 and the inner bore 203-tolerance ring 208 assembly, until the pivot-bearing 210 reaches the lower portion of the stepped inner bore 203 of actuator 202, below the step feature 205. Consequently, the likelihood that debris particles are generated during this assembly process, such as due to metals being scraped against one another, may be diminished (e.g., perhaps by approximately ½ for a single-step inner bore). Similarly, if a manufacturing process warrants assembling an actuator comb with a pivot assembly from the bottom of the actuator comb up into the comb, then the step feature could be reversed, whereby the diameter of the inner bore is larger at the lower portion than the diameter at the upper portion.

Figure 3:
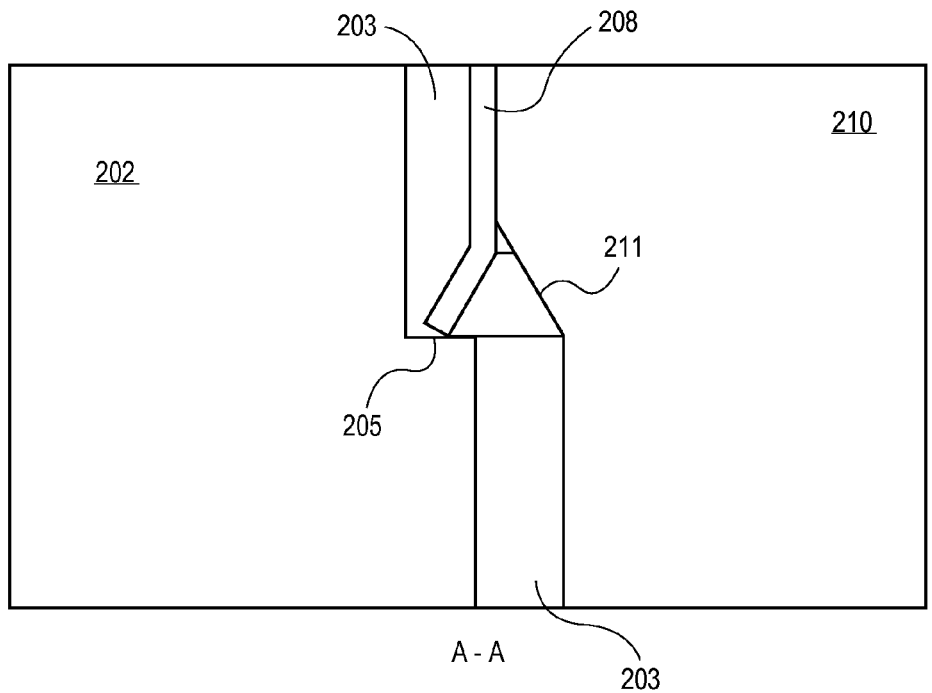
FIG. 3 is a magnified cross-sectional side view illustrating a step feature of an actuator comb inner bore and a corresponding pivot-bearing of an HSA, according to an embodiment.

According to an embodiment, one or more tolerance ring such as tolerance ring 208 is disposed within the stepped inner bore 203 of the actuator comb 202, to couple the actuator comb 202 with the pivot-bearing 210 which is interposed between the pivot-shaft 212 and the actuator comb 202. FIG. 3 is a magnified cross-sectional side view illustrating a step feature of an actuator comb inner bore and a corresponding pivot-bearing of an HSA, according to an embodiment. For example, FIG. 3 depicts a magnified view of area A-A of FIG. 2, illustrating the actuator comb 202-pivot-bearing 210 assembly interface.

FIG. 3 depicts an example of the step feature 205 of the inner bore 203 of actuator comb 202, with, according to an embodiment, a tolerance ring 208 seated thereon, and a corresponding but not necessarily identical step feature 211 of pivot-bearing 210.

According to an embodiment, a multiple-arm HSA, such as HSA 200 (FIG. 2) having actuator arms 204a-204n, comprises a plurality of tolerance rings disposed with the inner bore 203 of the actuator comb 202 to couple the actuator comb 202 with the pivot-bearing 210 which is interposed between the pivot-shaft 212 and the actuator comb 202. For example, HSA 200 may include two tolerance rings 208.

Figure 4:
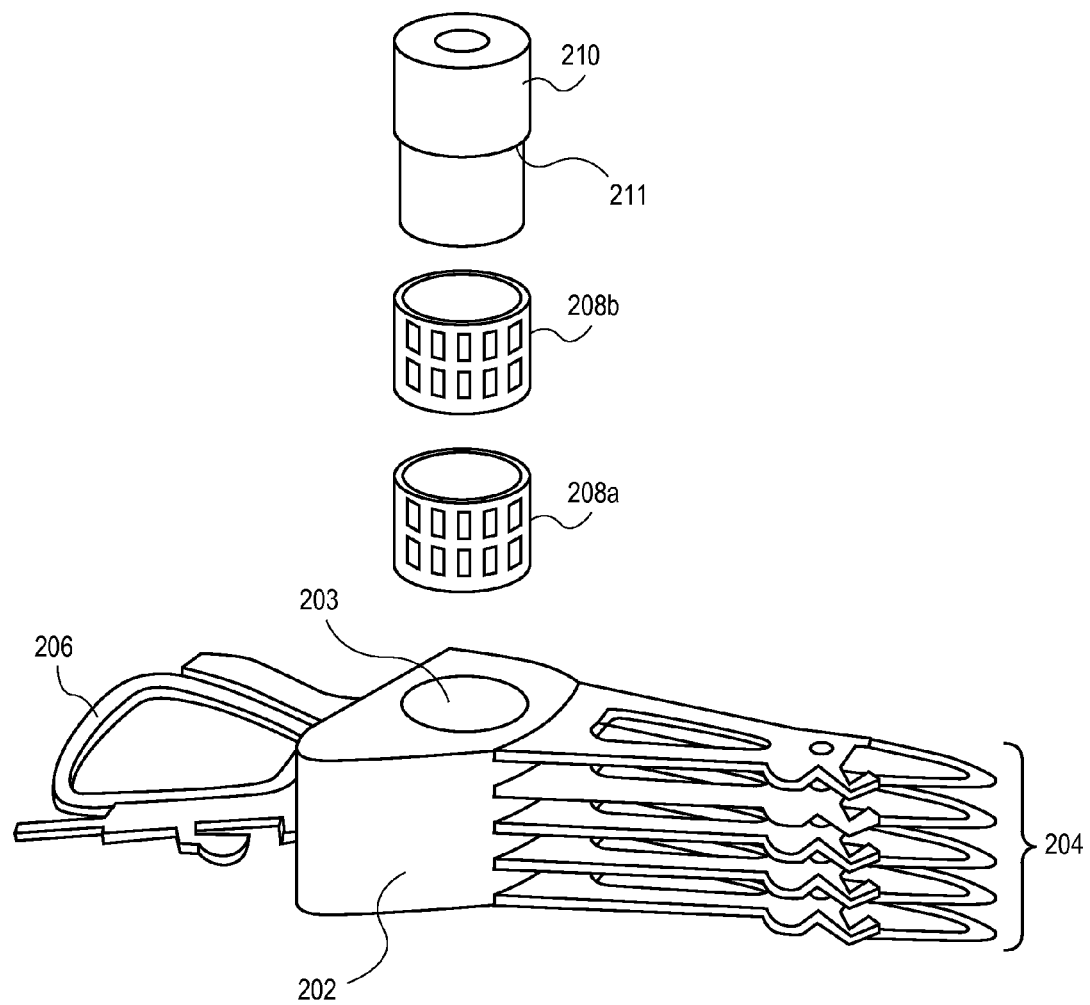
FIG. 4 is an exploded view illustrating an HSA, according to an embodiment.

FIG. 4 is an exploded view illustrating an HSA, according to an embodiment. According to an embodiment, a first tolerance ring 208a is positioned below the step feature 205 (see, e.g., step feature 205 of FIGS. 2-3) of the stepped inner bore 203 of the actuator comb 202, and a second tolerance ring 208b is positioned above the step feature 205 of the inner bore 203. Thus, the lower tolerance ring 208a mates with the portion of the pivot-bearing 210 below the step feature 205 and the upper tolerance ring 208b mates with the portion of the pivot-bearing 210 above the step feature 205. For an implementation example and according to an embodiment, the step feature 205 of stepped inner bore 203 may be positioned at about the middle of the inner bore 203 in the axial (Z-) direction. Thus, two of the same tolerance rings could be used to couple the actuator comb 202 with the pivot-bearing 210, thereby providing a suitable fit as well as avoiding cost by minimizing unique parts.

Further, use of multiple tolerance rings should not only ensure a better fit between the bearing cartridge and the actuator comb than would use of only a single tolerance ring, but also provide a potential cost avoidance of the significant cost associated with fabricating an unusually large (along the axial direction) tolerance ring. Such a multiple tolerance ring configuration is especially useful, although not limited to, an HSA having ten or more actuator arms, such as actuator arms 204a-204n of HSA 200 (FIG. 2).

While the foregoing embodiments have been described in the context of an actuator comb 202 having a stepped inner bore 203 having a single step feature 205 whereby an upper portion of the inner bore 203 has a first diameter and a lower portion of inner bore 203 has a second diameter that is less than the first diameter, additionally, multi-step embodiments are specifically contemplated. For example, an actuator comb inner bore could be configured with more than one step feature, whereby the diameter of the inner bore decreases in steps from the upper portion of the actuator comb to the lower portion of the actuator comb, and where the outer surface of the corresponding pivot-bearing has multiple step features which generally correspond to the step features of the inner bore and where the respective diameter of each of multiple tolerance rings is configured accordingly.

Method of Manufacturing a Head Stack Assembly

Figures 5, 6:
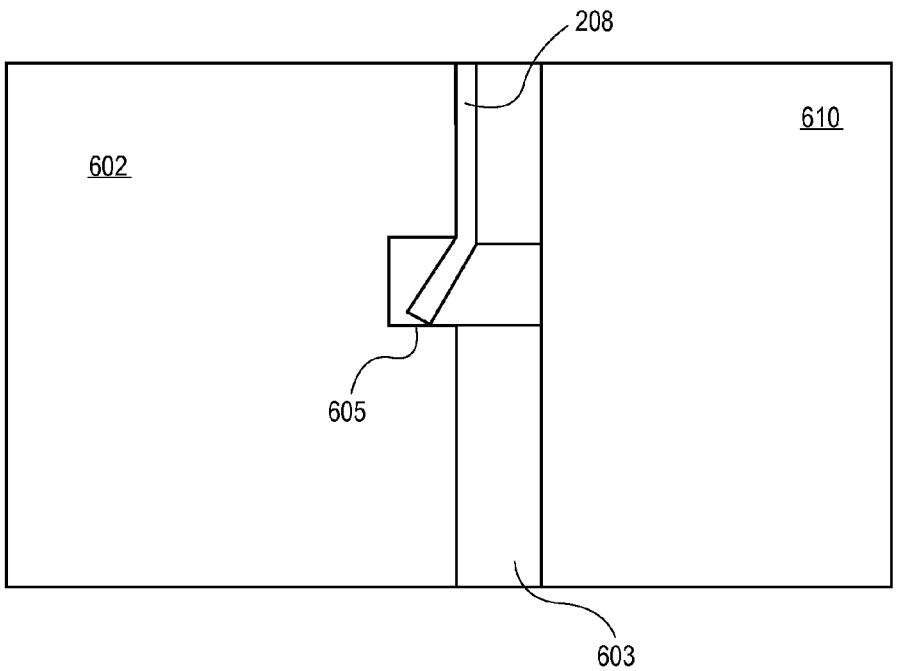
FIG. 5 is a flowchart illustrating a method for manufacturing an HSA, according to an embodiment.
FIG. 6 is a magnified cross-sectional side view illustrating a notch feature of an actuator comb inner bore of an HSA, according to an embodiment.

FIG. 5 is a flowchart illustrating a method for manufacturing an HSA, according to an embodiment. Reference is also made to the exploded view of FIG. 4 for exemplary purposes in the context of this method of manufacturing.

At block 502, a tolerance ring is inserted into an actuator comb inner bore having a step feature. For example, tolerance ring 208a and/or tolerance ring 208b is inserted into inner bore 203 of actuator comb 202. If a single tolerance ring is used, then the tolerance ring may span the entire axial length of inner bore 203 or a single shorter tolerance ring (e.g., tolerance ring 208a or 208b) may span the portion of inner bore 203 that is above the step feature 205 (FIGS. 2-3) or below the step feature 205 or may span a portion of inner bore 203 that includes the step feature 205, for example. If multiple tolerance rings are used, then one of the tolerance rings (e.g., tolerance ring 208b) may span the portion of inner bore 203 that is above the step feature 205 (FIGS. 2-3) and the other of the tolerance rings (e.g., tolerance ring 208a) may span the portion of inner bore 203 that is below the step feature 205, for example. Therefore, tolerance ring 208a would mate with the portion of inner bore 203 below the step feature 205 and with the portion of pivot-bearing 210 below the corresponding step feature 211 (e.g., the smaller diameter portions of the inner bore 203 and pivot-bearing 210), and tolerance ring 208b would mate with the portion of inner bore 203 above the step feature 205 and with the portion of pivot-bearing 210 above the corresponding step feature 211 (e.g., the larger diameter portions of the inner bore 203 and pivot-bearing 210).

At block 504, a pivot bearing assembly is interference fit inside of the tolerance ring and actuator comb, whereby the resistance above the step feature is less than the resistance below the step feature. For example, pivot-bearing 210 is press fit inside of the tolerance rings 208a, 208b, which are inset into the inner bore 203 of actuator comb 202 pursuant to block 502, and because of the differing diameters of the inner bore 203 the friction and the resistance offered by the upper tolerance ring 208b and/or upper portion of the inner bore 203 (larger diameter portion) is minimized until the pivot-bearing 210 is pushed beyond the step feature 205 into the lower tolerance ring 208a inset in the lower portion of inner bore 203 (smaller diameter portion). That is, the resistance offered by the upper tolerance ring 208b and/or upper portion of the inner bore 203 is less than the resistance offered by the lower tolerance ring 208a and/or the lower portion of inner bore 203. Because of the lesser degree of friction and thus resistance, debris particle generation is less likely than if a non-stepped (constant diameter) actuator comb inner bore was used.

Alternatively, the pivot bearing assembly could be interference fit into the one or more tolerance ring and then this pivot bearing-tolerance ring assembly interference fit into the actuator comb inner bore. However, because of the radial load applied to the tolerance ring(s) from the inserted pivot-bearing, and the presence of this radial load when inserting the bearing-ring assembly into the actuator comb, the likelihood of debris particle generation may be higher than with the method described in reference to FIG. 5.

A variation of the method described in reference to FIG. 5 may include seating the tolerance ring onto the step feature of the inner bore. For example, tolerance ring 208 (FIG. 3), or upper tolerance ring 208b (FIG. 4), is seated onto the step feature 205 (FIG. 3) of inner bore 203 of actuator comb 202.

Actuator Comb with a Notched Inner Bore for Tolerance Ring Seating

FIG. 6 is a magnified cross-sectional side view illustrating a notch feature of an actuator comb inner bore of an HSA, according to an embodiment. For example, FIG. 6 depicts a magnified view of an area similar to area A-A of FIG. 2, though illustrating an actuator comb 602-pivot-bearing 610 assembly interface. Rather than an actuator comb inner bore having different diameters, such as inner bore 203 of actuator comb 202 of FIG. 2, FIG. 6 depicts an example of a notch feature 605 of an inner bore 603 of an actuator comb 602, whereby the notch feature 605 provides a seat for a tolerance ring 208 seated thereon, and an associated pivot-bearing 610. The precise shape of the notch feature 605 may vary from implementation to implementation. Therefore, the square-shaped notch feature 605 depicted in FIG. 6 is just one exemplary shape. For non-limiting examples, the non-seating surface(s) of the notch feature 605 may be rounded or angled, and the like, as long as the lower seating surface is capable of providing a suitable seating for tolerance ring 208.

According to an embodiment, an HSA comprises a plurality of tolerance rings disposed within the inner bore 603 of the actuator comb 602 to couple the actuator comb 602 with the pivot-bearing 610 which is interposed between a pivot-shaft such as pivot-shaft 212 (FIG. 2) and the actuator comb 602. For example, the HSA may include two tolerance rings, such as tolerance ring 208a and tolerance ring 208b of FIG. 4, one positioned above and seated on notch feature 605 and one positioned below notch feature 605.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head stack assembly comprising:
an actuator comb comprising an actuator arm and a stepped inner bore having a step feature;
a voice coil coupled with said actuator comb; and
a tolerance ring disposed within said stepped inner bore of said actuator comb to couple said actuator comb with a pivot-bearing assembly interposed between a pivot-shaft and said actuator comb, wherein said tolerance ring is seated on and in contact with a radial extending surface of said step feature of said stepped inner bore when fully disposed within said stepped inner bore.

2. The head stack assembly of claim 1, wherein said stepped inner bore comprises an upper portion above said step feature and having a first diameter and a lower portion below said step feature and having a second diameter that is less than said first diameter.

3. The head stack assembly of claim 1, wherein said actuator comb comprises a plurality of actuator arms, said head stack assembly further comprising a plurality of tolerance rings disposed within said stepped inner bore of said actuator comb to couple said actuator comb with a pivot-bearing assembly interposed between a pivot-shaft and said actuator comb.

4. The head stack assembly of claim 3, wherein said plurality of tolerance rings includes a first tolerance ring positioned below said step feature of said stepped inner bore and a second tolerance ring positioned above and seated on said step feature of said stepped inner bore when fully disposed within said stepped inner bore.

5. The head stack assembly of claim 3, wherein said actuator comb comprises ten or more actuator arms.

6. The head stack assembly of claim 1, further comprising a stepped pivot-bearing assembly interposed between a pivot-shaft and said actuator comb, said stepped pivot-bearing assembly having a step feature corresponding to said step feature of said stepped inner bore of said actuator comb.

7. The head stack assembly of claim 1, wherein said step feature of said stepped inner bore of said actuator comb is positioned substantially at the middle of said stepped inner bore in an axial direction.

8. The head stack assembly of claim 1, wherein said stepped inner bore comprises an upper portion above said step feature and having a first diameter and a lower portion below said step feature and having a second diameter that is greater than said first diameter.

9. A hard disk drive comprising:
 a disk media rotatably mounted on a spindle; and
 a head stack assembly rotatably mounted on a pivot-shaft, said head stack assembly comprising:
 a head gimbal assembly including a head slider comprising a magnetic write head configured to write to said disk media,
 an actuator comb comprising an actuator arm with which said head gimbal assembly is coupled, said actuator comb having a stepped inner bore,
 a tolerance ring disposed within said stepped inner bore of said actuator comb to couple said actuator comb with a pivot-beating assembly interposed between said pivot-shaft and said actuator comb, wherein said tolerance ring is seated on and in contact with a radial extending surface of a step feature of said stepped inner bore when fully disposed within said stepped inner bore, and
 a voice coil actuator configured to move said actuator comb and said head slider to access portions of said disk media.

10. The hard disk drive of claim 9, wherein said stepped inner bore comprises an upper portion having a first diameter and a lower portion having a second diameter that is less than said first diameter.

11. The hard disk drive of claim 9, wherein said actuator comb comprises a plurality of actuator arms and said head stack assembly further comprises a plurality of tolerance rings disposed within said stepped inner bore of said actuator comb to couple said actuator comb with a pivot-bearing assembly interposed between said pivot-shaft and said actuator comb.

12. The hard disk drive of claim 11, wherein said plurality of tolerance rings includes a first tolerance ring positioned below said step feature of said stepped inner bore and a second tolerance ring positioned above and seated on said step feature of said stepped inner bore when fully disposed within said stepped inner bore.

13. The hard disk drive of claim 11, wherein said actuator comb comprises ten or more actuator arms.

14. The hard disk drive of claim 9, wherein said head stack assembly further comprises a stepped pivot-bearing assembly interposed between said pivot-shaft and said actuator comb, said stepped pivot-bearing assembly having a step feature corresponding to said step feature of said stepped inner bore of said of said actuator comb.

15. The hard disk drive of claim 9, wherein said stepped inner bore comprises multiple step features wherein each successive portion of said stepped inner bore has a smaller diameter than the immediately preceding portion of said stepped inner bore.

16. A method of manufacturing a head stack assembly, the method comprising:
 inserting a tolerance ring into an actuator comb inner bore having a step feature, thereby seating said tolerance ring onto and in contact with a radial extending surface of said step feature when fully inserted within said inner bore; and
 interference fitting a pivot-bearing assembly inside of said tolerance ring and said actuator comb, wherein resistance above said step feature of said inner bore of said actuator comb is less than resistance below said step feature of said inner bore.

17. The method of claim 16, wherein said actuator comb comprises a plurality of actuator arms, and wherein inserting said tolerance ring includes:
 inserting a first tolerance ring to a position below said step feature of said inner bore; and
 inserting a second tolerance ring to a position above and seated on said step feature of said inner bore when fully inserted within said inner bore.

18. The method of claim 16, wherein said step feature of said inner bore is positioned substantially at the middle of said inner bore in an axial direction, and wherein inserting said tolerance ring includes:
 inserting a first tolerance ring to a position below said step feature of said inner bore; and
 inserting a second tolerance ring to a position above and seated on said step feature of said inner bore when fully inserted within said inner bore.

* * * * *